US009301338B2

(12) United States Patent
Zander

(10) Patent No.: US 9,301,338 B2
(45) Date of Patent: Mar. 29, 2016

(54) WIRELESS COMMUNICATIONS DEVICES CONFIGURED FOR MULTIPLE RADIO ACCESS TECHNOLOGIES AND RELATED METHODS AND SYSTEMS

(75) Inventor: Olof Zander, Lund (SE)

(73) Assignees: Sony Corporation, Tokyo (JP); Sony Mobile Communications AB, Lund (SE)

(*) Notice: Subject to any disclaimer, the term of this patent is extended or adjusted under 35 U.S.C. 154(b) by 0 days.

(21) Appl. No.: 13/703,701

(22) PCT Filed: Feb. 17, 2012

(86) PCT No.: PCT/IB2012/000288
§ 371 (c)(1),
(2), (4) Date: Dec. 12, 2012

(87) PCT Pub. No.: WO2013/121241
PCT Pub. Date: Aug. 22, 2013

(65) Prior Publication Data
US 2015/0038191 A1 Feb. 5, 2015

(51) Int. Cl.
*H04W 88/06* (2009.01)
*H04B 1/00* (2006.01)
*H04B 7/08* (2006.01)

(52) U.S. Cl.
CPC ............ *H04W 88/06* (2013.01); *H04B 1/006* (2013.01); *H04B 7/0825* (2013.01)

(58) Field of Classification Search
USPC .................................. 455/67.13, 434, 552.1
See application file for complete search history.

(56) References Cited

U.S. PATENT DOCUMENTS

| 2007/0021080 A1 | 1/2007 | Kuriyama et al. |
| 2007/0082646 A1 | 4/2007 | Mehzad et al. |
| 2009/0068974 A1* | 3/2009 | Smith .......................... 455/304 |

FOREIGN PATENT DOCUMENTS

| CN | 1946217 A | 4/2007 |
| DE | 101 08 310 A1 | 9/2002 |

OTHER PUBLICATIONS

Notification Concerning Transmittal of International Preliminary Report on Patentability, PCT/IB2012/000288, Aug. 19, 2014.
Notification of Transmittal of the International Search Report and the Written Opinion of the International Searching Authority, of the Declaration, PCT/IB2012/000288, Nov. 28, 2012.
First Notification of Office Action, Chinese Application No. 201280069866.7 Mar. 11, 2015.
$2^{nd}$ Notification of Office Action and Search Report, CN 201280069866.7, Aug. 20, 2015, 17 pages.

* cited by examiner

*Primary Examiner* — Kashif Siddiqui
*Assistant Examiner* — Minjung Kim
(74) *Attorney, Agent, or Firm* — Myers Bigel & Sibley

(57) ABSTRACT

Wireless communications devices are provided including a housing; a first antenna positioned in the housing, the first antenna being associated with a first receiver; and a second antenna positioned in the housing, the second antenna being associated with a second receiver, the second receiver being different from the first receiver. One of the first receiver and the second receiver is configured to support at least two radio access technologies by co-banding frequencies associated with the at least two radio access technologies. Related systems and antenna systems are also provided.

14 Claims, 6 Drawing Sheets

WIRELESS COMMUNICATIONS DEVICES CONFIGURED FOR MULTIPLE RADIO ACCESS TECHNOLOGIES AND RELATED METHODS AND SYSTEMS

CROSS-REFERENCE TO RELATED APPLICATION

This application is a 35 U.S.C. §371 national stage application of PCT International Application No. PCT/IB2012/000288, filed on Feb. 17, 2012, the disclosure and contents of which are incorporated by reference herein as if set forth in its entirety.

FIELD

The present application relates generally to wireless communications devices, and more particularly to, wireless communications devices that support multiple radio access technologies and related methods and systems.

BACKGROUND

Various digital mobile phone standards are currently deployed worldwide. These standards include, for example, Global System for Mobile Communications (GSM) and Universal Mobile Telecommunications Service (UMTS) in Europe and (Code-Division Multiple Access) CDMA in the United States. Due to the increasing demand for mobile telephone services, many of these standards are deployed together. In addition, further deployments of new standards are currently underway or will be in the foreseeable future. For example, the Long Term Evolution (LTE) standard and the IEEE 802.16 (WiMax) standard are currently being deployed.

In the transition from the currently deployed standards (second generation) to the third or fourth generation standards, both second and third generation standards currently coexist and will continue to do so for the foreseeable future. Thus, multi-frequency band systems, that include two or more frequency bands belonging to two or more communication standards will continue to coexist in parallel and will work together to provide coverage and services to the wireless communications devices.

Many new frequency bands have been deployed for use and operators are requesting increased roaming capability. Roaming is a general term referring to the extension of connectivity service in a location that is different from a home location where the service was registered. Roaming typical increases the likelihood that the wireless communications device is connected to the network, without losing the connection. Thus, there is now a demand for wireless communications devices to support more than one frequency band. For example, legacy GSM/Enhanced Data GSM Environment (EDGE) may be required on overlapping Wideband Code-Division Multiple Access (WCDMA) frequency bands, such as GSM850/WCDMA B5 and GSM900/WCDMA B8.

To comply with both the demand for more functionality in the wireless communications device as well as the decreased size of the wireless communications device, conventional wireless communications devices re-use filters for the GSM path, which is called co-banding, i.e, the filters are reused for the same frequency. Since WCDMA is a full duplex system (can transmit/receive data in two directions simultaneously), a duplex filter is used for WCDMA, which has a higher insertion loss than a single receive filter. Thus, improved methods of co-banding are desired.

SUMMARY

Some embodiments of the present inventive concept provide wireless communications devices including a housing; a first antenna positioned in the housing, the first antenna being associated with a first receiver; and a second antenna positioned in the housing, the second antenna being associated with a second receiver, the second receiver being different from the first receiver. One of the first receiver and the second receiver is configured to support at least two radio access technologies by co-banding frequencies associated with the at least two radio access technologies.

In further embodiments, the first receiver may be a primary receiver and the second receiver may be a secondary receiver. The secondary receiver may be configured to support the at least two radio access technologies.

In still further embodiments, a first of the at least two radio access technologies may include one of Global System for Mobile Communications (GSM) and Enhanced Data GSM Environment (EDGE) and a second of the at least two radio access technologies may include one of Universal Mobile Telecommunications Service (UMTS), Long Term Evolution (LTE) and Code-Division Multiple Access (CDMA).

In some embodiments, the first receiver may be a primary receiver and the second receiver may be a secondary receiver. The primary receiver may be configured to support the at least two radio access technologies.

In further embodiments, a first of the at least two radio access technologies may be one of Global System for Mobile Communications (GSM) and Enhanced Data GSM Environment (EDGE) and a second of the at least two radio access technologies may be one of Universal Mobile Telecommunications Service (UMTS), Long Term Evolution (LTE) and Code-Division Multiple Access (CDMA).

In still further embodiments, the wireless communications device may further include a simplex filter associated with the one of the first receiver and the second receiver that is configured to support at least two radio access technologies.

Some embodiments of the present inventive concept provide methods for providing use of multiple radio access technologies in a single wireless communications device. The methods include receiving data in compliance with a first radio access technology through a first receiver associated with a first antenna positioned in a housing of the wireless communications device; and receiving data in compliance with the first radio access technology and a second radio access technology, different from the first radio access technology, through a second receiver, different from the first receiver, associated with a second antenna positioned in the housing of the wireless communications device. The second receiver is configured to support both the first and second radio access technologies by co-banding frequencies associated with the first and second radio access technologies.

Sill further embodiments of the present inventive concept provide antenna systems for use in a wireless communications device. The antenna systems include a first antenna being associated with a first receiver; and a second antenna being associated with a second receiver, the second receiver being different from the first receiver. One of the first receiver and the second receiver is configured to support at least two radio access technologies by co-banding frequencies associated with the at least two radio access technologies.

Other devices, methods and/or systems according to embodiments of the inventive concept will be or become apparent to one with skill in the art upon review of the following drawings and detailed description. It is intended that all such additional devices, methods, and/or systems be included within this description, be within the scope of the present inventive concept, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the inventive concept and are incorporated in and constitute a part of this application, illustrate certain embodiment(s) of the inventive concept. In the drawings.

DETAILED DESCRIPTION OF EMBODIMENTS

In the following detailed description, numerous specific details are set forth in order to provide a thorough understanding of the present inventive concept. However, it will be understood by those skilled in the art that the present inventive concept may be practiced without these specific details. In other instances, well-known methods, procedures, components and circuits have not been described in detail so as not to obscure the present inventive concept.

As discussed above, improved methods of co-banding (re-using filters) are desired. Thus, some embodiments of the present inventive concept provide wireless communications devices that are configured to co-band GSM/EDGE with UMTS/LTE on the secondary receive path (diversity/multiple-input multiple-output (MIMO) path). Since dual receive paths are typically required (for RX diversity and MIMO), embodiments of the present inventive concept use the secondary receive path for the GSM/EDGE receive mode. Since GSM/EDGE is time division (TD) system, receive and transmit are not active at the same time. Thus, a simplex (communication in one direction at a time) filter can be used for this path. As discussed above, a duplex filter typically has a higher insertion loss than a simplex filter. As used herein, insertion loss refers to $10 \log_{10}(P_{in}/P_{out})$, where $P_{in}$ refers to the power in and $P_{out}$ refers to the power out. Thus, use of a simplex filter for this path in accordance with some embodiments of the present inventive concept may decrease insertion loss (as the simplex filter can be manufactures with lower insertion loss) and, therefore, receive performance may not be degraded.

It will be understood that the GSM/EDGE transmit path can use either the primary or the secondary antenna without departing from the scope of the present application. Thus, hardware in the wireless communications device can be reused between, for example, GSM/EDGE and UMTS/LTE without degradation in the performance of the wireless communications device. Details of embodiments of the present inventive concept will be discussed further below with respect to FIGS. 1 through 6.

It will be understood that although embodiments of the present inventive concept are discussed herein with respect to GSM/EDGE and UMTS/LTE, embodiments of the present invention are not limited to this configuration. For example, GSM/EDGE may be matched with CDMA or any other system that lends itself to the details of the present inventive concept as discussed herein.

Figure 1:
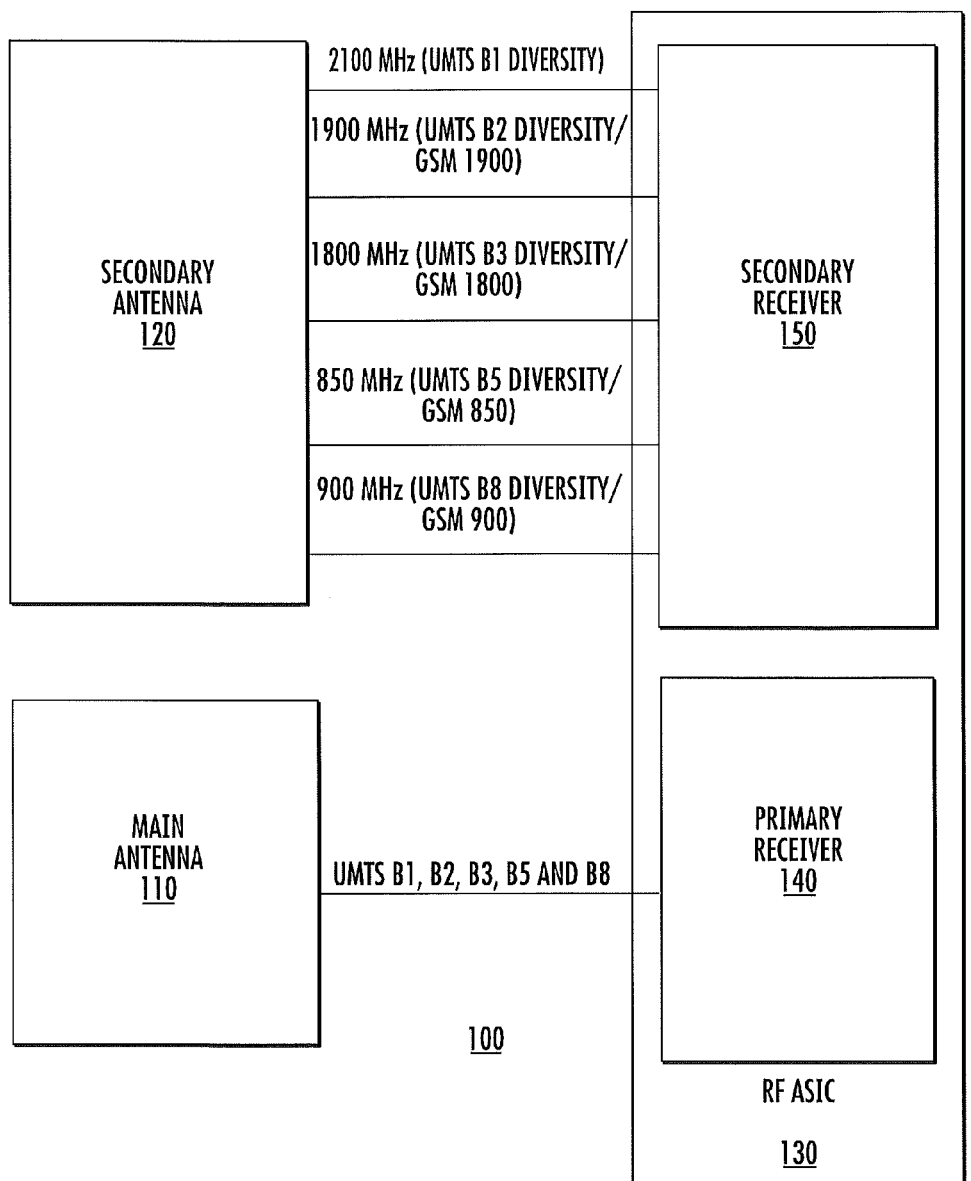
FIG. 1 is a high level block diagram including an antenna system in accordance with some embodiments of the present inventive concept.

Referring first to FIG. 1, an antenna system 100 in accordance with some embodiments of the present inventive concept will be discussed. As illustrated therein, the antenna system 100 includes a main antenna 110, a secondary antenna 120, and an radio frequency (RF) application-specific integrated circuit (ASIC) 130 including a primary receiver 140 and a secondary receiver 150. It will be understood that FIG. 1 is a simplified diagram of embodiments of the present inventive concept and, therefore, does not include all the elements in the actual antenna system. A more detailed block diagram of the system 100 will be discussed with respect to FIG. 2.

As further illustrated in embodiments of FIG. 1, the secondary antenna 120 reuses filters (co-banding) such that the secondary receiver 150 is used for both UMTS and GSM. As illustrated in FIG. 1, both UMTS frequency bands according to 3GPP band 1 (B1), band 2 (B2), band 3 (B3), band 5 (B5) and band 8 (B8) diversity bands and GSM 1900, 1800, 850 and 900 MHz bands are supported by the secondary receiver 150. In embodiments illustrated in FIG. 1, the main antenna 110 is used solely for the UMTS B1, B2, B3, B5 and B8 diversity bands.

Figure 2:
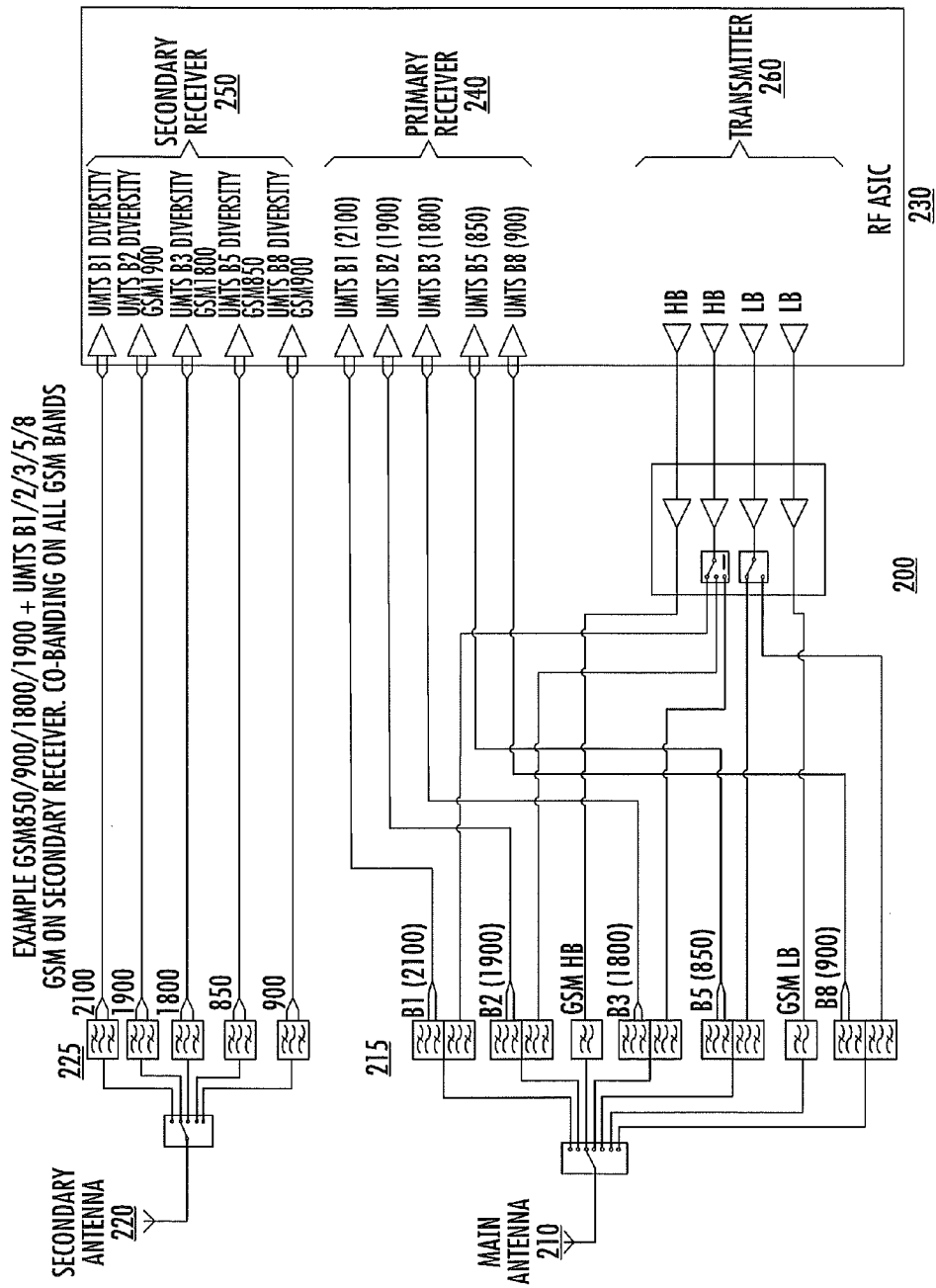
FIG. 2 is a more detailed connection diagram of the antenna system illustrated in FIG. 1 in accordance with some embodiments of the present inventive concept.

A more detailed block diagram of the antenna system 100 will now be discussed with respect to FIG. 2. As illustrated therein, the antenna system 200 includes a main antenna 210, a secondary antenna 220, a series of filters 215, 225 and an RF ASIC 230 including a primary receiver 240, a secondary receiver 250 and a transmitter 260. The main antenna 210 is coupled to the primary receiver 240 and transmitter 260 through a series of filters 215. In the embodiment illustrated in FIG. 2, the main antenna 210 supports UMTS B1, B2, B3, B5 and B8 diversity bands. As further illustrated in FIG. 2, the secondary antenna 220 is coupled to the secondary receiver 250 through a series of filters 225 that are co-banded. Both the UMTS B1, B2, B3, B5 and B8 diversity bands and GSM 850, GSM 900, GSM 1800 and GSM 1900 bands are supported by the secondary antenna 220 and filters 225. Thus, there is co-banding on all GSM bands illustrated in FIG. 2.

Figure 3:
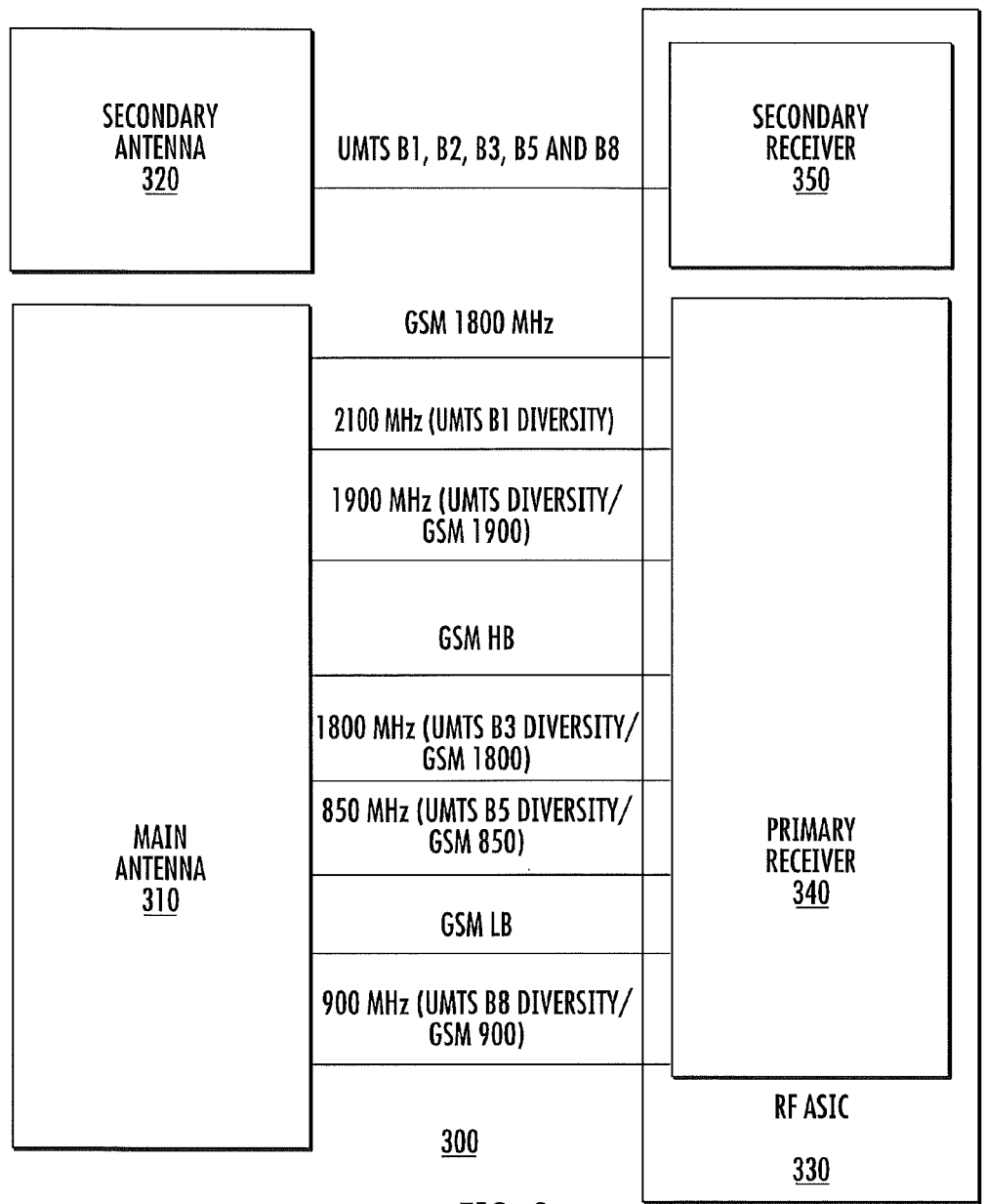
FIG. 3 is a high level block diagram including an antenna system in accordance with some embodiments of the present inventive concept.

As discussed above the GSM/EDGE transmit path can use either the primary or the secondary antenna without departing from the scope of the present application. Referring now to FIG. 3, embodiments of the present inventive concept that use the main antenna will now be discussed. As illustrated in FIG. 3, an antenna system 300 includes a main antenna 310, a secondary antenna 320, and an RF ASIC 330 including a primary receiver 340 and a secondary receiver 350. It will be understood that FIG. 3 is a simplified diagram of embodiments of the present inventive concept and, therefore, does not include all the elements in the actual antenna system. A more detailed block diagram of the system 300 will be discussed with respect to FIG. 4.

As further illustrated in embodiments of FIG. 3, the main antenna 310 reuses filters (co-banding) such that the primary receiver 340 is used for both UMTS and GSM. As illustrated in FIG. 3, both UMTS B1, B2, B3, B5 and B8 diversity standards and GSM 1900, 1800, 850 and 900 MHz bands are supported by the secondary receiver 150. However, in these embodiments, only GSM 850, 900 and 1900 are co-banded. In embodiments illustrated in FIG. 3, the secondary antenna 320 is used solely for the UMTS B1, B2, B3, B5 and B8 diversity bands.

Figure 4:
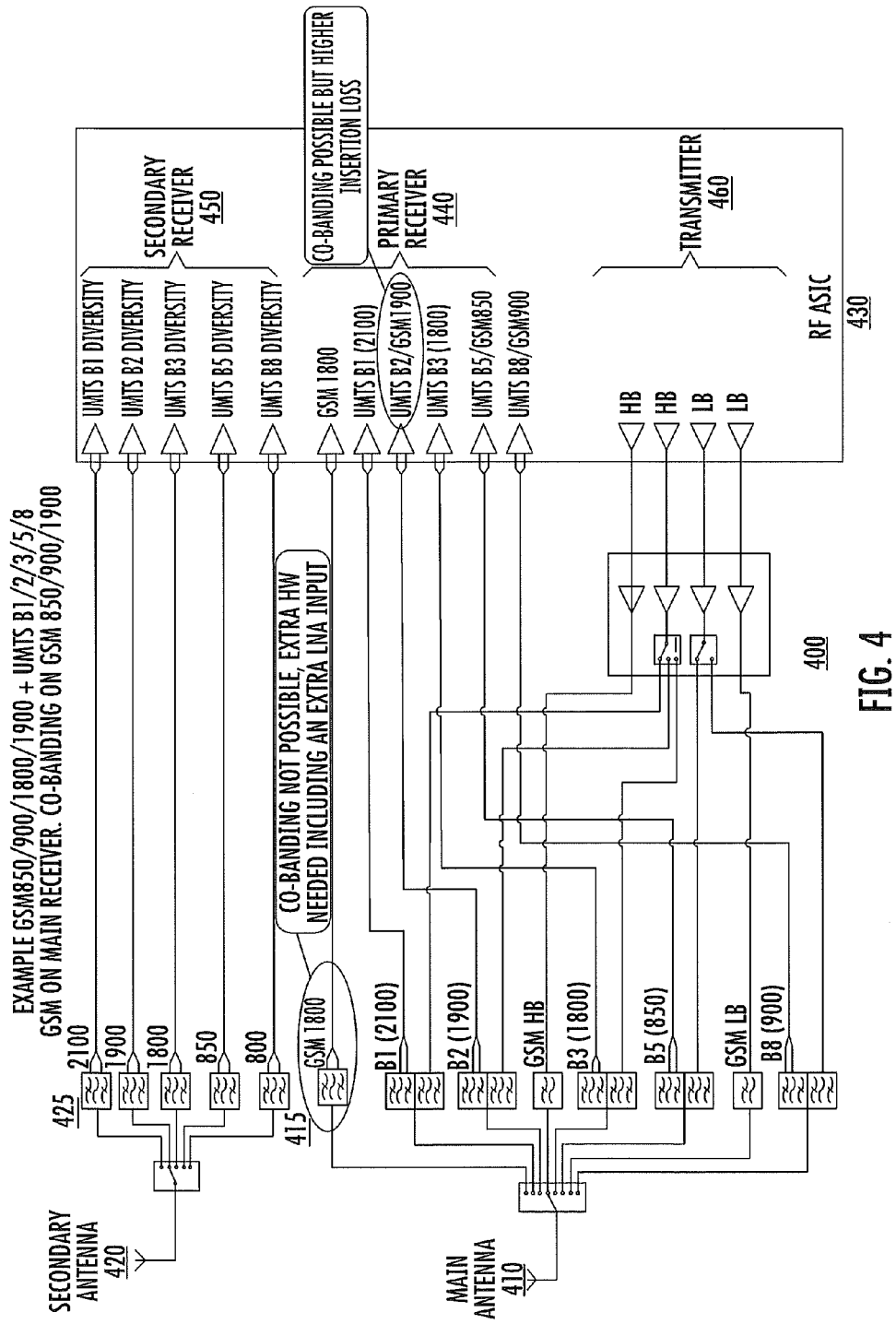
FIG. 4 is a more detailed connection diagram of the antenna system illustrated in FIG. 3 in accordance with some embodiments of the present inventive concept.

A more detailed block diagram of the antenna system 300 will now be discussed with respect to FIG. 4. As illustrated therein, the antenna system 400 including a main antenna 410, a secondary antenna 420, a series of filters 415, 425, and an RF ASIC 430 including a primary receiver 440, a secondary receiver 450 and a transmitter 460. The main antenna 410 is coupled to the primary receiver 440 and transmitter 460 through a series of filters 415 that are co-banded. Both the UMTS B1, B2, B3, B5 and B8 diversity bands and GSM 850, GSM 900, GSM 1800 and GSM 1900 bands are supported by the main antenna 410. However, as illustrated in FIG. 4, only the GSM 850, GSM 900 and GSM 1900 bands are co-banded. The GSM 1800 band has not been co-banded in embodiments illustrated in FIG. 4. It may be possible to co-band the GSM 1800 band with the addition of extra hardware including an extra LNA. Furthermore, it may also be possible to co-band the GSM 1900 band, but it may experience relatively higher insertion losses.

Thus, embodiments of the present inventive concept illustrated in FIGS. 1-4 use the secondary receive path for the GSM/EDGE receive mode. Since GSM/EDGE is time division (TD) system, receive and transmit are not active at the same time. Thus, a simplex (communication in one direction at a time) filter can be used for this path. As discussed above, a duplex filter typically has a higher insertion loss than a simplex filter. Thus, use of a simplex filter for this path in accordance with some embodiments of the present inventive concept may decrease insertion and, therefore, receive performance may not be degraded.

Figure 5:
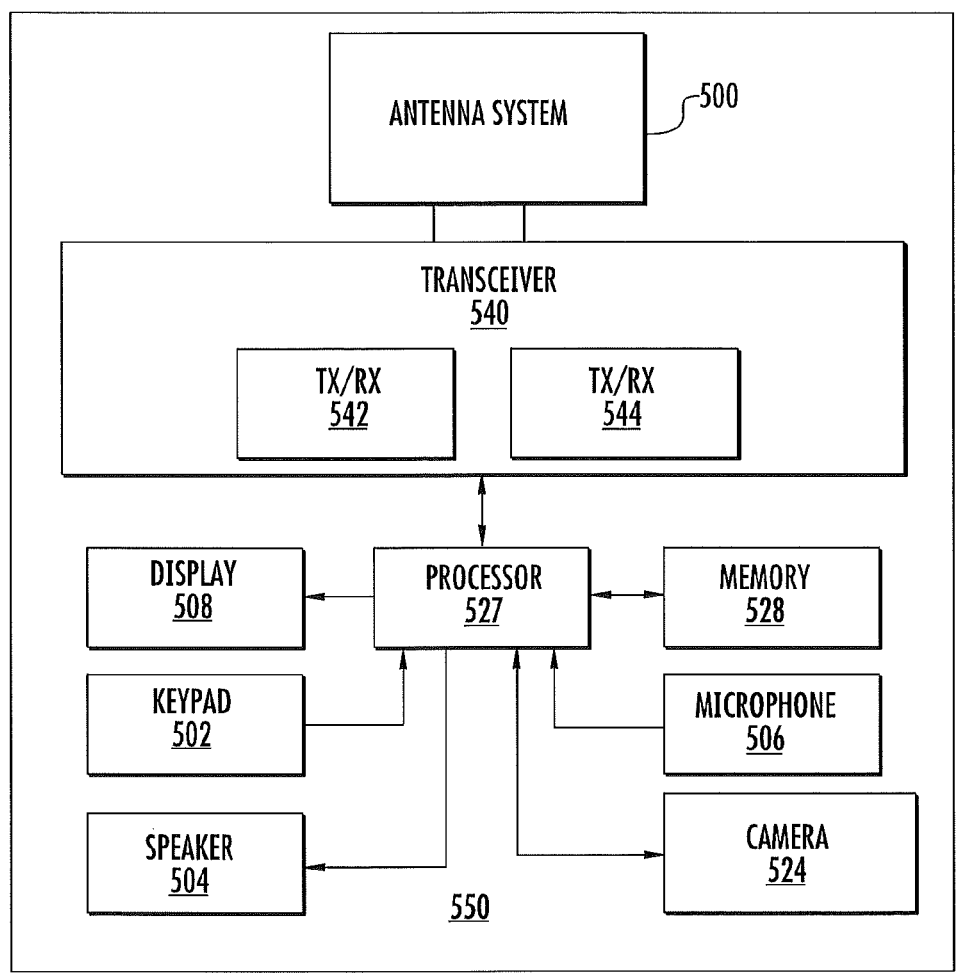
FIG. 5 is a block diagram of some electronic components of a wireless communication terminal in accordance with some embodiments of the present inventive concept.

Referring now to FIG. 5, a wireless communications device in accordance with embodiments of the present inventive concept will be discussed. As illustrated in FIG. 5, a block diagram of a wireless communication terminal 550 that includes an antenna system 500 in accordance with some embodiments of the present inventive concept will be discussed. It will be understood that the antenna system 500 can be any one of the antenna systems 100, 200, 300 and 400 discussed above with respect to FIGS. 1, 2, 3 and 4, respectively, without departing from the scope of the present inventive concept. As further illustrated in FIG. 5, the terminal 550 includes an antenna system 500, a transceiver 540, a processor 527, and can further include a conventional display 508, keypad 502, speaker 504, memory 528, microphone 506, and/or camera 524.

The transceiver 540 may include transmit/receive circuitry (TX/RX) that provides separate communication paths for supplying/receiving RF signals to different radiating elements of the antenna system 500 via their respective RF feeds.

The transceiver 540 in operational cooperation with the processor 527 may be configured to communicate according to at least one radio access technology in two or more frequency ranges. The at least one radio access technology may include, but is not limited to, WLAN (e.g., 802.11), WiMAX (Worldwide Interoperability for Microwave Access), TransferJet, 3GPP LTE (3rd Generation Partnership Project Long Term Evolution), Universal Mobile Telecommunications System (UMTS)(aka High Speed Packet Access (HSPA), Global Standard for Mobile (GSM) communication, General Packet Radio Service (GPRS), enhanced data rates for GSM evolution (EDGE), DCS, PDC, PCS, code division multiple access (CDMA), wideband-CDMA, and/or CDMA2000. Other radio access technologies and/or frequency bands can also be used in embodiments according to the inventive concept.

Figure 6:
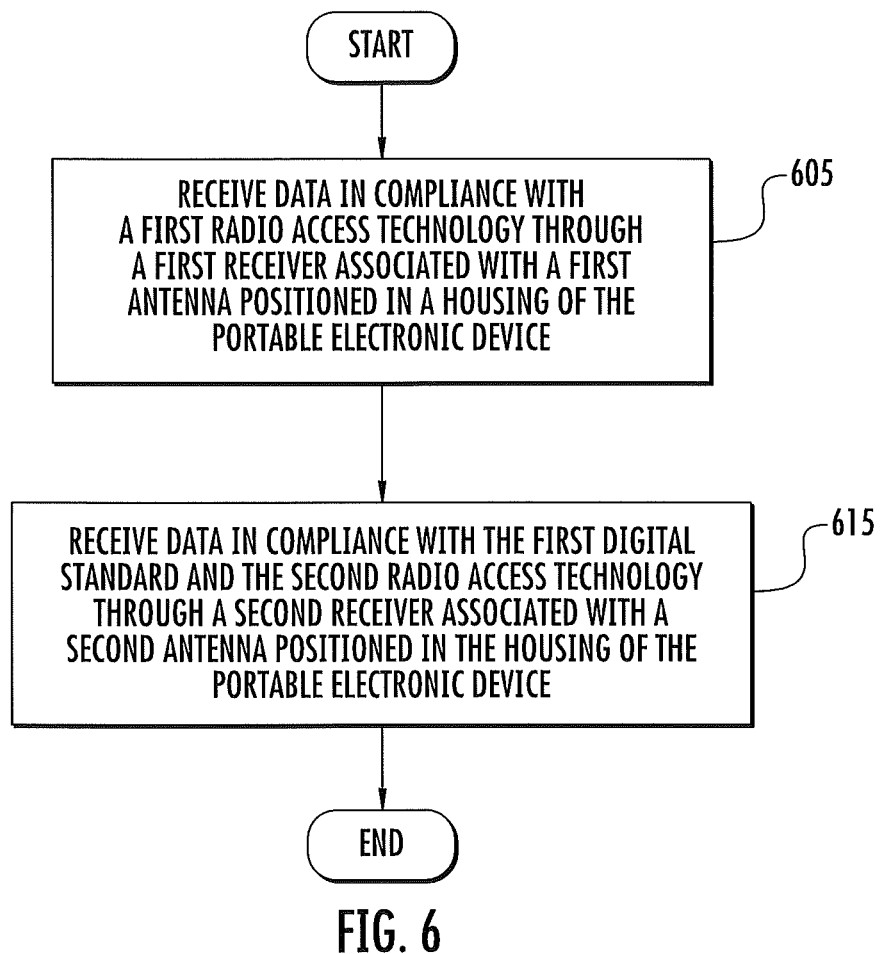
FIG. 6 is a flowchart illustrating operations in accordance with various embodiments of the present inventive concept.

Referring now to the flowchart of FIG. 6, operations for providing use of multiple radio access technologies in a single wireless communications device will be discussed. Operations begin at block 605 by receiving data in compliance with a first radio access technology through a first receiver associated with a first antenna positioned in a housing of the wireless communications device. Data is received in compliance with the first radio access technology and a second radio access technology, different from the radio access technology, through a second receiver, different from the first receiver, associated with a second antenna positioned in the housing of the wireless communications device (block 615). The second receiver is configured to support both the first and second radio access technologies by co-banding frequencies associated with the first and second radio access technologies. As discussed above, in some embodiments, the first receiver is a primary receiver and the second receiver is a secondary receiver. In further embodiments, the first receiver is a secondary receiver and the second receiver is a primary receiver.

In some embodiments, the second radio access technology comprises one of Global System for Mobile Communications (GSM) and Enhanced Data GSM Environment (EDGE) and the first radio access technology comprises one of Universal Mobile Telecommunications Service (UMTS), Long Term Evolution (LTE) and Code-Division Multiple Access (CDMA). However, it will be understood that embodiments of the present inventive concept are not limited this configuration. Any radio access technologies that lend themselves to the teachings of the present inventive concept may be used without departing from the scope of the present inventive concept.

Various embodiments were described herein with reference to the accompanying drawings, in which embodiments of the inventive concept are shown. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art.

It will be understood that, when an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Furthermore, "coupled", "connected", "responsive", or variants thereof as used herein may include wirelessly coupled, connected, or responsive. Like numbers refer to like elements throughout. The terminology used herein is for the purpose of describing particular embodiments only and is not intended to be limiting of the inventive concept. As used herein, the singular forms "a", "an" and "the" are intended to include the plural forms as well, unless the context clearly indicates otherwise. Well-known functions or constructions may not be described in detail for brevity and/or clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive concept. Moreover, as used herein, the term "and/or" includes any and all combinations of one or more of the associated listed items.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, if used herein, the common abbreviation "e.g.", which derives from the Latin phrase exempli gratia, may be used to introduce or specify a general example or examples of a previously mentioned item, and is not intended to be limiting of such item. If used herein, the common abbreviation "i.e.", which derives from the Latin phrase id est, may be used to specify a particular item from a more general recitation.

Many different embodiments were disclosed herein, in connection with the above described description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

For purposes of illustration and explanation only, various embodiments of the present inventive concept were described herein in the context of user equipment (e.g., "wireless user terminal(s)", "wireless communication terminal(s)", "wireless terminal(s)", "terminal(s)", "user terminal(s)", etc.) that are configured to carry out cellular communications (e.g., cellular voice and/or data communications). It will be understood, however, that the present inventive concept is not limited to such embodiments and may be embodied generally in any wireless communication terminal that is configured to transmit and receive according to one or more RATs. Moreover, "user equipment" is used herein to refer to one or more pieces of user equipment. Acronyms "UE" and "UEs" may be used to designate a single piece of user equipment and multiple pieces of user equipment, respectively.

As used herein, the term "user equipment" includes cellular and/or satellite radiotelephone(s) with or without a multi-line display; Personal Communications System (PCS) terminal(s) that may combine a radiotelephone with data processing, facsimile and/or data communications capabilities; Personal Digital Assistant(s) (PDA) or smart phone(s) that can include a radio frequency transceiver and a pager, Internet/Intranet access, Web browser, organizer, calendar and/or a global positioning system (GPS) receiver; and/or conventional laptop (notebook) and/or palmtop (netbook) computer(s) or other appliance(s), which include a radio frequency transceiver. As used herein, the term "user equipment" also includes any other radiating user device that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Finally, the terms "node" or "base station" includes any fixed, portable and/or transportable device that is configured to communicate with one or more user equipment and a core network, and includes, for example, terrestrial cellular base stations (including microcell, picocell, wireless access point and/or ad hoc communications access points) and satellites, that may be located terrestrially and/or that have a trajectory above the earth at any altitude.

In the drawings and specification, there have been disclosed embodiments of the inventive concept and, although specific terms are employed, they are used in a generic and descriptive sense only and not for purposes of limitation, the scope of the inventive concept being set forth in the following claims.

What is claimed is:

1. A wireless communications device, comprising:
   a housing;
   a first antenna positioned in the housing, the first antenna being associated with a first receiver;
   a second antenna positioned in the housing, the second antenna being associated with a second receiver, the second receiver being different from the first receiver,
   wherein one of the first receiver and the second receiver is configured to support at least two radio access technologies, each defined by a different frequency band, by co-banding the different frequency bands associated with the at least two radio access technologies; and
   a simplex filter associated with the one of the first receiver and the second receiver that is configured to support the different frequency bands associated with the at least two radio access technologies, such that co-banding includes using the simplex filter for all the supported at least two radio access technologies and wherein all the different frequency bands are co-banded,
   wherein the one of the first and second receiver has an associated receive path and wherein the receive path of the one of the first and second receiver and the simplex filter support the at least two radio access technologies.

2. The wireless communications device of claim 1:
   wherein the first receiver is a primary receiver and the second receiver is a secondary receiver; and
   wherein the secondary receiver is configured to support the at least two radio access technologies.

3. The wireless communications device of claim 2, wherein a first of the at least two radio access technologies comprises one of Global System for Mobile Communications (GSM) and Enhanced Data GSM Environment (EDGE) and a second of the at least two radio access technologies comprises one of Universal Mobile Telecommunications Service (UMTS), Long Term Evolution (LTE) and Code-Division Multiple Access (CDMA).

4. The wireless communications device of claim 1:
   wherein the first receiver is a primary receiver and the second receiver is a secondary receiver; and
   wherein the primary receiver is configured to support the at least two radio access technologies.

5. The wireless communications device of claim 4, wherein a first of the at least two radio access technologies comprises one of Global System for Mobile Communications (GSM) and Enhanced Data GSM Environment (EDGE) and a second of the at least two radio access technologies comprises one of Universal Mobile Telecommunications Service (UMTS), Long Term Evolution (LTE) and Code-Division Multiple Access (CDMA).

6. A method for providing use of multiple radio access technologies in a single wireless communications device, the method comprising:
  receiving data in compliance with a first radio access technology through a first receiver associated with a first antenna positioned in a housing of the wireless communications device; and
  receiving data in compliance with the first radio access technology and a second radio access technology, different from the first radio access technology, through a second receiver, different from the first receiver, associated with a second antenna positioned in the housing of the wireless communications device,
  wherein the second receiver is configured to support both the first and second radio access technologies each defined by a respective frequency band by co-banding the respective frequencies associated with the first and second radio access technologies; and
  wherein co-banding comprises using a simplex filter associated with the one of the first receiver and the second receiver that is configured to support the respective frequency bands of the first and second radio access technologies to filter both of the supported at least two radio access technologies and wherein the first and second frequency bands are all co-banded,
  wherein the one of the first and second receiver has an associated receive path and wherein the receive path of the one of the first and second receiver and the simplex filter support the at least two radio access technologies.

7. The method of claim 6, wherein the first receiver is a primary receiver and the second receiver is a secondary receiver.

8. The method of claim 6, wherein the first receiver is a secondary receiver and the second receiver is a primary receiver.

9. The method of claim 6, wherein the second radio access technologies comprises one of Global System for Mobile Communications (GSM) and Enhanced Data GSM Environment (EDGE) and the first radio access technology comprises one of Universal Mobile Telecommunications Service (UMTS), Long Term Evolution (LTE) and Code-Division Multiple Access (CDMA).

10. An antenna system for use in a wireless communications device, comprising:
  a first antenna being associated with a first receiver;
  a second antenna being associated with a second receiver, the second receiver being different from the first receiver,
  wherein one of the first receiver and the second receiver is configured to support at least two radio access technologies, each defined by a different frequency band, by co-banding the different frequency bands associated with the at least two radio access technologies; and
  a simplex filter associated with the one of the first receiver and the second receiver that is configured to support the different frequency bands associated with the at least two radio access technologies, such that co-banding includes using the simplex filter for all the supported at least two radio access technologies and wherein all the different frequency bands are co-banded,
  wherein the one of the first and second receiver has an associated receive path and wherein the receive path of the one of the first and second receiver and the simplex filter support the at least two radio access technologies.

11. The antenna system of claim 10:
  wherein the first receiver is a primary receiver and the second receiver is a secondary receiver; and
  wherein the secondary receiver is configured to support the at least two radio access technologies.

12. The antenna system of claim 11 wherein a first of the at least two radio access technologies comprises one of Global System for Mobile Communications (GSM) and Enhanced Data GSM Environment (EDGE) and a second of the at least two radio access technologies comprises one of Universal Mobile Telecommunications Service (UMTS), Long Term Evolution (LTE) and Code-Division Multiple Access (CDMA).

13. The antenna system of claim 10:
  wherein the first receiver is a primary receiver and the second receiver is a secondary receiver; and
  wherein the primary receiver is configured to support the at least two radio access technologies.

14. The antenna system of claim 13, wherein a first of the at least two radio access technologies comprises one of Global System for Mobile Communications (GSM) and Enhanced Data GSM Environment (EDGE) and a second of the at least two radio access technologies comprises one of Universal Mobile Telecommunications Service (UMTS), Long Term Evolution (LTE) and Code-Division Multiple Access (CDMA).

* * * * *